United States Patent [19]

Andrea

[11] Patent Number: 4,972,697
[45] Date of Patent: Nov. 27, 1990

[54] METHOD FOR THE MANUFACTURE OF THE CASING FOR A PARROT-TYPE LOCKING DEVICE

[76] Inventor: Spinelli Andrea, 72, Loc. Castellare, 53049 Torrita di Siena, I, Siena, Italy

[21] Appl. No.: 362,968

[22] Filed: Jun. 8, 1989

[30] Foreign Application Priority Data

Jun. 30, 1988 [IT] Italy ................... 1226 A/88

[51] Int. Cl.⁵ ................... B21C 37/02; B21D 28/26
[52] U.S. Cl. ................... 72/379.2; 29/160.6; 29/557; 72/338
[58] Field of Search .............. 72/335, 338, 379; 29/160.6, 172, 557; 24/241 SB, 241 PS

[56] References Cited

U.S. PATENT DOCUMENTS

| | | | |
|---|---|---|---|
| 990,526 | 4/1911 | Coble | 24/241 SB |
| 1,562,482 | 11/1925 | Woernle | 72/379 |
| 1,702,596 | 2/1929 | Crockett | 24/241 SP |
| 2,483,091 | 9/1949 | Glos | 72/379 |
| 2,566,459 | 9/1951 | McCoy | 72/379 |
| 4,785,868 | 11/1988 | Koenig, Jr. | 72/379 |

FOREIGN PATENT DOCUMENTS

| | | | |
|---|---|---|---|
| 9500 | 4/1907 | United Kingdom | 29/160.6 |
| 482066 | 3/1938 | United Kingdom | 72/379 |
| 1470791 | 4/1977 | United Kingdom | 72/379 |

*Primary Examiner*—Robert L. Spruill
*Attorney, Agent, or Firm*—Young & Thompson

[57] ABSTRACT

A method of manufacturing a casing of a "Parrot-type" locking device; this kind of locking device is currently used in manufacturing ornamental items. The metallic band from which the flat structure (1) is punched is engraved with the track (2) and the markings (7), then the slot (8) is cut together with the outline of the structure (1) that will later be formed into a hairpin bend along its axis of symmetry in order to house the spring trigger in its central part while the upper end is flattened and bent as a hook thus giving origin to the operating ring (9) of the locking device.

4 Claims, 1 Drawing Sheet

METHOD FOR THE MANUFACTURE OF THE CASING FOR A PARROT-TYPE LOCKING DEVICE

The invention consists in the casing of the "Parrot-type" locking device and in its manufacturing method, where a metallic band, through forming and shearing stages, provides the casing that will originate the "Parrot-type" locking device once it is loaded, manually or automatically, with the spring trigger; such locking device will be used for bracelets and necklaces in gold and silver and generally in the field of imitation jewelry.

"Parrot-type" locking device, where the casing is obtained by means of forming stages starting from a metallic band, are known.

The spring trigger is then loaded into the casings thus manufactured either manually or automatically or semi-automatically giving origin to the finished locking device.

Until now, these casings, obtained by means of forming process, are manufactured following two different ways.

One way consists in making a flat oblong outline consisting of the two fronts of the casing, connected by a narrow band and having, at each free and opposing end, a hook with the same shape so that, when the outline is bent round the cross center line of the narrow band, the two fronts with hook overlap prefectly; the hooks are then welded together originating the fixed part of the locking device operating ring, while the narrow band where the bend was made, determines the lower or fixing ring.

The second way consists in shearing a rather stocky outline: at one side two holes are punched while, at the other, two opposing hooks are protruding; the outline looks therefore like two flat shapes connected along the back line of the locking device.

When the outline is bent round the said back line, the two sides overlap and the hooks can be welded together. A second welding point is generally required near the two holes that overlap after bending, originating the fixing ring of the locking device.

The casings manufactured with the said methods after the shearing and forming stages require therefore the welding stage that slows down the production rate and requires special equipment and fuel gas supplies; furthermore the welding stage has to take place far from the station where the spring trigger is loaded to avoid loss of the spring resilience due to the heat.

Summing up, the production process of the "parrot-type" locking device with formed casing manufactured with the above described methods, not only is slowed down by the welding stage but requires also separate machine or plants manufacturing the locking device components in order to keep the welding station far from the spring trigger and from the spring trigger production lines.

These disadvantages are thoroughly overcome adopting the casing described by the present patent where no welding stage is required so that the casing, the spring trigger and its loading can take place in neighboring stations and even on the same machine or device with no need either for welding means or for cooling provisions to protect the spring.

In this way, the manufacturing process for the casing of the "parrot-type" locking device is made more easly as no welding means are required to the point that it is possible to design an automatic production line thus achieving easily imaginable advantages.

The casing structure and its manufacturing method will be easily understood by following the detailed description given hereunder and referring to the examples reported in the enclosed drawing, where:

Figure 1:
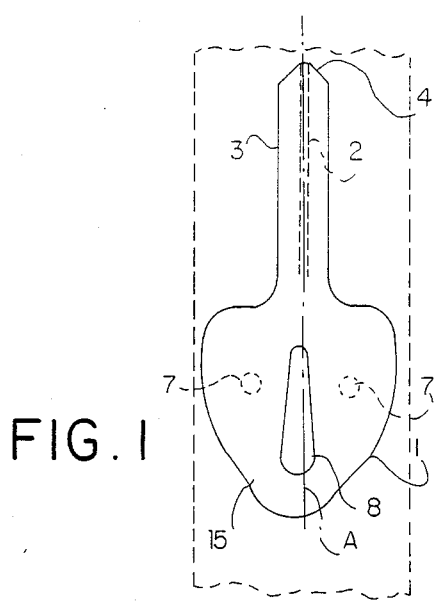
FIG. 1 is the front view of the casing before forming, and the metallic band from which the outline is obtained, is marked with dotted lines.
Figure 2:
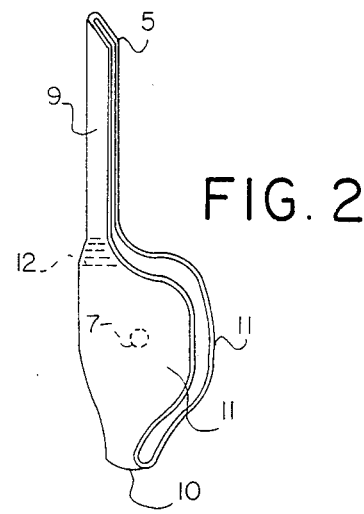
FIG. 2 is the perspective view of the casing after the forming stage along its axis of symmetry and the flattening of its long tail.

It must pointed out however that the drawing figures are only examples and that the outline, the position of the central slot and of the track and markings can be different in production.

In the drawing number 1 marks the casing blank obtained from a metallic band or sheet, where the straight track (2) is engraved in order to render easy the hairpin bending of the long tail marked with number 3, and with a suitable shape at its far end (4) to originate the shoulder (5) for the spring trigger (6) when the locking device is complete.

Besides the track (2), the two markings (7) are engraved on the metallic band to house the protruding extensions of the spring trigger acting as axle ends.

The metallic band undergoes one or more shearing stages to obtain the slot (8) and the outline (1); if required, these stages will be followed by a deformation by compression with the aim to make thin the edge of the outline (1) so that the surface will swell masking the poor look of the sheared structure.

The flat outline (1) wholly detached or partially connected to the metallic band, is bend around its axis of symmetry "A" and, as a consequence, the flat outline (1) is bent like a "U" where surfaces (1) face one another and the markings (7) are lined up on the same axis to house the spring trigger (14). The lower end (15) is drawn in to a bridge (10) that will be used as a fixing ring when the locking device is complete.

Figure 3:
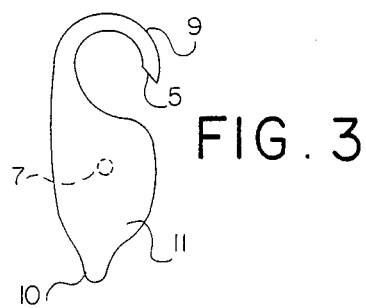
FIG. 3 is the front view of the casing with the long tail formed into a hook.
Figure 4:
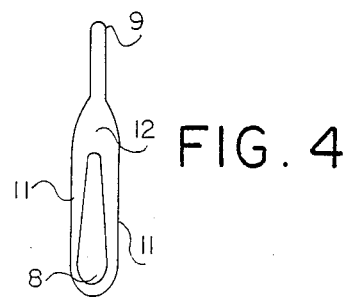
FIG. 4 is the front view of the back of the casing represented in FIG. 3.
Figure 5:
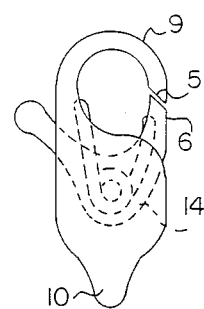
FIG. 5 is the front view of the complete locking device obtained making use of the casing described in this patent.

The upper long tail (3) is bent around the track (2) and then flattened to its origin (12) so that its two faces contact each other. The long extension (9) is thus obtained and is ready to be formed into a hook in a further stage, as shown in FIG. 3.

According to the method used to insert the spring trigger into the casing, the forming of the long extension (9) will take place either after the insertion of the spring trigger, after the final forming of the casing and after the full detachment of the structure from the metallic band or even the final forming of the casing can take place after the last part of the outline is sheared from metallic band, being loaded with the spring trigger in a second time.

The structure of the casing thus manufactured does not require welding but only shearing and forming operations.

I claim:

1. A method of manufacturing a parrot locking device casing, comprising punching from a strip of metal a blank having a relatively narrow tail and a relatively wide body to which the tail is attached, forming an elongated slot closed at both ends; into the relatively wide body the tail and the elongated slot lying on an axis of symmetry of the blank, and folding the blank about said axis of symmetry until two halves of said tail contact each other but two halves of said relatively wide body are parallel to each other but spaced apart.

2. A method as claimed in claim 1, and forming an area of the blank which is at the end of said slot opposite said tail in to a bridge disposed transversely to said axis of symmetry.

3. A method as claimed in claim 1, and punching aligned holes through said halves of said relatively wide body for the reception of a pin to retain a spring trigger.

4. A method as claimed in claim 1, and in a subsequent stage bending said tail in a plane parallel to planes in which said halves of said body lie, until said tail has a U-shape and terminates in an end directed toward said halves of said relatively wide body.

* * * * *

UNITED STATES PATENT AND TRADEMARK OFFICE
CERTIFICATE OF CORRECTION

PATENT NO. : 4,972,697
DATED : November 27, 1990
INVENTOR(S) : Andrea SPINELLI

It is certified that error appears in the above—identified patent and that said Letters Patent is hereby corrected as shown below:

ON TITLE PAGE:

In Item [19], change the surname from "Andrea" to --Spinelli--.

In Item [76], change the inventor's name from "Spinelli Andrea" to --Andrea Spinelli--.

Signed and Sealed this

Twelfth Day of May, 1992

Attest:

DOUGLAS B. COMER

*Attesting Officer*  *Acting Commissioner of Patents and Trademarks*